United States Patent

[11] 3,561,485

[72] Inventor Hughlin E. Klingler
 223 Arcade Ave., Elkhart, Ind. 46514
[21] Appl. No. 787,792
[22] Filed Dec. 30, 1968
[45] Patented Feb. 9, 1971

[54] MIXING FAUCET USING DRAWN METAL PARTS
 9 Claims, 3 Drawing Figs.
[52] U.S. Cl. ............................................. 137/625.17,
 251/143/
[51] Int. Cl. ..................................................... F16k 11/07
[50] Field of Search ...................................... 137/625.17,
 (Inquired); 251/367

[56] References Cited
UNITED STATES PATENTS
3,026,907 3/1962 Klingler ..................... 137/625.17
3,168,112 2/1965 Klingler ..................... 137/625.17
3,204,656 9/1965 Moen ......................... 137/625.17X
3,354,910 11/1967 Moen ......................... 137/625.17

Primary Examiner—M. Cary Nelson
Assistant Examiner—R. B. Rothman
Attorney—Austin A. Webb ABSTRACT: A casing of drawn tubular metal is secured in projecting relation through a stamped sheet metal mounting ring. Tubular supply pipes notched at their upper ends are soldered to sides of the casing and against the bottom of the ring to deliver to supply ports in the side of the casing. A hollow cylindrical core slides and rotates in the casing to variably register a transverse lower slot with the supply ports. An upper slot moved into registry with outlet ports formed through the sides of the casing. A spigot has a sleeve sealed around the casing above the ring, with an outlet groove registering with the outlet ports. A vent tube extends through the hollow center of the core and is sealed thereto at each end to vent the lower end of the casing. A clamp bar secured to the bottom of the casing supports screws opposed to the clamp ring.

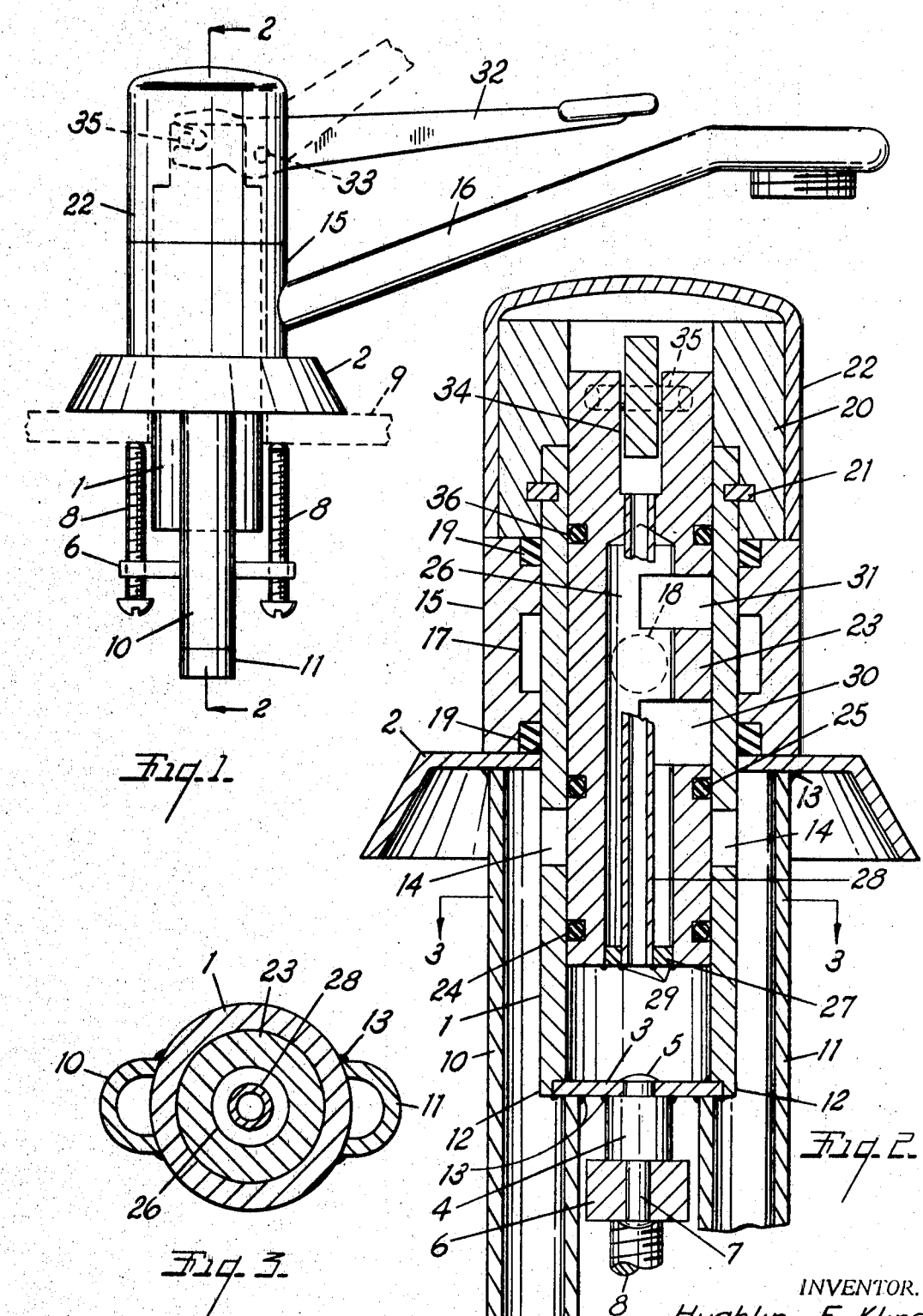

MIXING FAUCET USING DRAWN METAL PARTS

OUTLINE OF INVENTION

It is an object of the invention to form the casing and supply connections of a mixing faucet and swing nozzle of drawn tubular parts which are accurately and inexpensively formed as drawn tubes, to coact with a rotatable and reciprocable cylindrical core having O-ring seals to prevent undesired flow between the supply ports and the outlet groove.

A further object is to vent the lower end of the core to the upper end so that any liquid leaking from the valve is visible from the top, and so that axial movement of the core is not blocked by vacuum or liquid which may leak into the bottom of the casing.

Other objects and advantages of the invention will be apparent from a consideration of the following description and claims. The drawings, of which there is one sheet, illustrate a preferred form of the faucet.

FIG. 1 is a side elevational view of the faucet.

FIG. 2 is a fragmentary cross-sectional view taken along the plane of the line 2–2 in FIG. 1, with the faucet closed.

FIG. 3 is a cross-sectional view taken along the line 3–3 in FIG. 2.

The faucet consists of a casing 1, made of a length of drawn brass tubing. The casing projects through a downwardly concave circular mounting plate 2. A plug 3 secured in the bottom of the casing carries a stud 4 riveted to the plug at 5, and a clamp bar 6 is riveted to the lower end of the stud at 7. Clamp screws 8 are threaded through the clamp bar to clamp the plate on a support indicated by the dotted lines at 9.

The casing 1 is arranged to be connected to hot and cold water pipes through the inlet tubes 10 and 11. The tubes 10 and 11 are brass tubing of smaller diameter than the casing and have axially extending segmental notches cut from their upper ends as at 12 so that the supply tubes overlap the opposite sides of the casing and extend upwardly to abut the bottom side of the mounting plate. Silver solder joints are indicated at 13 which mechanically connect the casing, mounting plate, clamp bar and supply pipes in a rigid unit with the supply pipes having watertight connections to the casing. The tubes 10 and 11 open into the casing through inlet ports 14 formed through the side of the tubular casing.

Rotatable about the upper end of the casing and supported on the mounting plate 2 is a sleeve 15 which carries the discharge spigot 16. The sleeve has an internal annular groove 17 communicating between an outlet port 18 in the side of the casing and the flow passage in the spigot (not illustrated). Packings 19 arranged in grooves in the ends of the sleeve seal the sleeve to the casing. The sleeve 15 is held down against the mounting plate by a cylindrical cap piece 20 having a shoulder bore fitting over the upper extremity of the casing. A U-shaped retaining key 21 fits into coacting grooves formed externally around the upper end of the casing and internally within the bore in the cap. A cup-shaped decorative cover 22 fits slidably and removably over the cap 20.

The faucet is regulated by a cylindrical brass core 23 that has a sliding fit within the interior of the casing 1. Axially spaced O-ring seals 24 and 25 carried in grooves near the lower end of the core are positioned on axially opposite sides of the inlet ports 14 when the core is raised to shut off position as illustrated. The core has an interior bore 26 formed upwardly from the bottom thereof which forms a flow and mixing passage through the faucet. An annular plug 27 closes the lower end of the flow passage and is sealed around the lower end of a vent pipe 28 by silver solder joints indicated at 29. The vent tube 28 projects upwardly through the upper end of the core to open the space below the core and within the casing to atmospheric pressure. This permits the core to move easily in the casing. Further, should there by any leakage into the bottom of the casing it will be directed upwardly through the vent tube to the tube of the casing where the existence of the leak will be detected so that necessary repairs can be made before the leak causes any damage.

The mixing and flow passage 26 within the core opens to the interior surface of the casing through a lower inlet notch 30 and an upper outlet notch 31. When the core is lowered the notch 30 registers with the inlet ports 14 while the outlet notch 31 registers with the outlet port 18. Rotation of the core within the casing causes the inlet notch 30 to register variably and selectively between the inlet ports to add more or less of hot or cold water to provide the desired temperature.

Axial and rotary adjustment of the core 23 is accomplished by the movement of the operating handle 32 which projects through a slot in the cover 22. The cap piece 20 which is retained axially on the casing by the key 21 has a slot through which the handle 32 projects and is supported by a pivot 33. The inner end of the handle 32 extends into a slot 34 formed axially in the upper end of the core, and the handle has a notched inner end receiving the cross pin 35 which is supported across the slot in the core. As will be apparent upward movement of the handle 32 causes lowering movement of the pin 35 to depress the core and open the faucet. Rotary swinging motion of the handle 32 rotates the cap 20 and the core to effect rotation of the core and the temperature adjustment of the faucet.

A third O-ring seal 36 carried around the core above the outlet notch 31 prevents any leakage from the casing to the upper end of the faucet.

I claim:

1. A body for a mixing faucet comprising:
  a tubular cylindrical casing open at the top and closed at the bottom by a plug;
  tubular supply pipes having segmental notches in their upper ends secured to the sides of said casing with the bottom of the casing secured to the bottoms of the notches and closing the sides of the notches;
  a mounting ring secured around the midportion of said casing in closing relation to the upper ends of said pipes and projecting radially therebeyond;
  said casing defining inlet ports opening to the upper ends of said pipes;
  a clamp bar secured to the bottom of said casing in projecting relation between said supply pipes and adapted to support clamp screws in opposed relation to said mounting ring;
  said casing having an outlet port formed through its side above said mounting ring;
  an annular groove formed around the exterior of said casing above said outlet port;
  said groove being adapted to coact with a retaining member for holding a core actuating cap member rotatably in position on the upper end of said casing; and
  flowed metal sealing and holding connections between the adjacent edges of said casing, said plug, said pipes and said mounting ring.

2. A faucet body as defined in claim 1 in which there is a post secured to said plug and said clamp bar and spacing the bar below said casing, and in which said groove is spaced substantially above said outlet port permitting the location of an annular base of a spigot to be mounted in rotatable relation around said casing and over the top of said ring.

3. A faucet body as defined in claim 1 in which said casing and said supply pipes are formed from drawn metal tubing.

4. A mixing faucet comprising:
  a tubular cylindrical casing closed at its lower end;
  a pair of supply pipes projecting downwardly below said casing and having segmental notches in their upper ends secured and sealed to the side of said casing along the edges of said notches and communicating with said casing through inlet ports formed through opposite sides of the casing;
  an outlet port formed through said casing in spaced relation above said inlet ports;
  a cylindrical core rotatably and slidably mounted within said casing and defining an axially extending central mixing chamber closed at each end;

a lateral inlet passage formed in said core and rotatably selectively registrable with said inlet ports and axially selectively movable with said core into and out of registry with said inlet ports;

a lateral outlet passage formed in said core and slidably selectively registrable with said outlet port when said inlet passage is in registry with said inlet ports;

a vent tube extending through said mixing chamber and in sealed relation through the ends thereof to open to said casing above and below said core;

delivery means mounted on said casing and defining a delivery passage communicating with said outlet port;

a cap member mounted in rotatable relation on the upper end of said casing above said delivery means; and means connecting said cap member to said core to permit rotatable and axial movement of the core relative to the casing.

5. A mixing faucet as defined in claim 4 in which there is a mounting ring rigidly connected around said casing above said supply pipes, said means forming said delivery passage including a spigot with an annular base rotatable about said casing and retained between said mounting ring and said cap member.

6. A mixing faucet as defined in claim 4 in which said mixing chamber is formed by a bore from one end of said core, and a plug closing the entry end of said bore, said vent tube having one end extending in sealed relation through said plug.

7. A mixing faucet as defined in claim 6 in which said plug and the lower end of said vent tube are located at the lower end of said core and within the closed end of said casing.

8. A mixing faucet as defined in claim 4 in which:
said casing and said supply pipes are formed of cylindrical tubing;
a plug closing the lower end of said casing;
said supply pipes having notches formed in their upper ends receiving the sides and the adjacent portions of the lower end of said casing;
a mounting ring secured around said casing in closing relation to the upper ends of said supply pipes; and
soldered joints connecting and sealing the adjacent surfaces of said casing, said supply pipes and said mounting ring.

9. A mixing faucet as defined in claim 8 in which there is a clamp support secured to the bottom of said casing and adapted to support clamp screws in opposed relation to said mounting ring.